(12) United States Patent
Fujiwara et al.

(10) Patent No.: US 11,364,557 B2
(45) Date of Patent: Jun. 21, 2022

(54) DRILL

(71) Applicant: MOLDINO Tool Engineering, Ltd., Tokyo (JP)

(72) Inventors: Shigeyoshi Fujiwara, Yasu (JP); Yusuke Hara, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 97 days.

(21) Appl. No.: 16/957,213

(22) PCT Filed: Dec. 13, 2018

(86) PCT No.: PCT/JP2018/045904
§ 371 (c)(1),
(2) Date: Jun. 23, 2020

(87) PCT Pub. No.: WO2019/131177
PCT Pub. Date: Jul. 4, 2019

(65) Prior Publication Data
US 2020/0398350 A1 Dec. 24, 2020

(30) Foreign Application Priority Data
Dec. 26, 2017 (JP) .............................. JP2017-249825

(51) Int. Cl.
*B23B 51/02* (2006.01)
(52) U.S. Cl.
CPC .......... *B23B 51/02* (2013.01); *B23B 2251/12* (2013.01); *B23B 2251/408* (2013.01); *B23B 2251/44* (2013.01)

(58) Field of Classification Search
CPC .......... B23B 2251/44; B23B 2251/443; B23B 2251/40; B23B 2251/408; B23B 51/02;
(Continued)

(56) References Cited

U.S. PATENT DOCUMENTS 6,585,460 B1 * 7/2003 Meece .................... B23B 51/02
408/227
9,511,424 B2 * 12/2016 Takai ...................... B23B 51/02
(Continued)

FOREIGN PATENT DOCUMENTS

| JP | 2014-008549 A | 1/2014 |
| JP | 2014018883 A * | 2/2014 |

(Continued)

OTHER PUBLICATIONS

International Search Report dated Mar. 19, 2019, issued for PCT/JP2018/045904 and English translation thereof.

*Primary Examiner* — Chwen-Wei Su
(74) *Attorney, Agent, or Firm* — Locke Lord LLP (57) ABSTRACT

In this drill, a wall face of a chip removal groove includes a first wall face having a concave curve shape and a second wall face having a straight line shape in a cross section orthogonal to an axis of the drill main body, an extension line of a straight line of the second wall face extends in a direction opposite to a drill rotation direction as the straight line of the second wall face goes to an outer periphery side of the drill main body with respect to a radius line connecting an outer peripheral end of the second wall face and the axis with each other, the cutting edge includes a first cutting edge having a concave curve shape and a second cutting edge having a straight line shape which intersects with the first cutting edge at an obtuse angle.

7 Claims, 8 Drawing Sheets

(58) Field of Classification Search
CPC .......... B23B 2251/12; B23B 2251/122; B23B 2251/125; B23B 2251/24; B23B 2251/14; B23B 2222/16; B23B 2222/28; B23B 2222/92; B23B 2222/24
See application file for complete search history.

(56) References Cited

U.S. PATENT DOCUMENTS

| | | | |
|---|---|---|---|
| 10,646,934 B2 * | 5/2020 | Tsutsumi | B23B 51/02 |
| 11,085,106 B2 * | 8/2021 | De Flon | B33Y 10/00 |
| 2017/0274460 A1 | 9/2017 | Jindai | |

FOREIGN PATENT DOCUMENTS

| | | | |
|---|---|---|---|
| JP | 2015-093351 | A | 5/2015 |
| JP | 5762547 | B2 | 8/2015 |
| JP | 2016-002617 | A | 1/2016 |
| JP | 2017-124475 | A | 7/2017 |
| WO | 2006/079317 | A1 | 8/2006 |
| WO | 2016/043098 | A1 | 3/2016 |

* cited by examiner

DRILL

TECHNICAL FIELD

The present invention relates to a drill which includes a chip removal groove on an outer periphery of a tip end portion of a drill main body rotating around an axis, and in which a cutting edge is formed at an intersecting ridgeline between a wall face of the chip removal groove which faces in a drill rotation direction and a tip end flank face of the drill main body.

Priority is claimed on Japanese Patent Application No. 2017-249825, filed Dec. 26, 2017, the content of which is incorporated herein by reference.

BACKGROUND ART

As such a drill, for example, Patent Document 1 discloses a drill which includes a chip removal groove opening on a tip end surface, and a cutting edge formed at an intersecting portion between an inner wall face of the chip removal groove which faces in a drill rotation direction and a tip end flank face formed on the tip end surface, wherein the cutting edge is constituted by a concave curve cutting edge portion formed on an inner periphery side and a convex curve cutting edge portion formed on an outer periphery side, and in a cross section orthogonal to an axis, a first convex curve forming the convex curve cutting edge portion with the tip end flank face and a first concave curve forming the concave curve cutting edge portion with the tip end flank face intersect with each other.

Further, Patent Document 2 discloses a drill in which a rake face is provided with a negative land, and each ridgeline where a negative land and a flank face, the flank face and a margin, and the negative land and the margin intersect with each other is a convex curved surface in a longitudinal right-angled cross section, wherein, when a radius of curvature of the convex curved surface of a first ridgeline at a position where the flank face and the negative land intersect with each other is defined as 1, the radius of curvature of the convex curved surface of a second ridgeline at a position where the flank face and the margin intersect with each other is 0.8 to 1.5, and the radius of curvature of the convex curved surface of a fourth ridgeline at a position where the negative land and the margin intersect with each other is 1.5 to 3.0.

CITATION LIST

Patent Literature

[Patent Document 1] Japanese Patent No. 5762547
[Patent Document 2] PCT International Publication No. WO 2016/043098

DISCLOSURE OF INVENTION

Technical Problem

Among these, Patent Document 1 discloses that in the cross section orthogonal to the axis, the first convex curve forming the convex curve cutting edge portion with the tip end flank face and the first concave curve forming the concave curve cutting edge portion with the tip end flank face intersect with each other, and thus chips generated from the cutting edge are curled, have no needle-like projections, and have shapes with relatively short overall lengths to that extent, thereby facilitating removal of the chips and increasing removal performance to further improve tool life of the drill.

However, in the drill disclosed in Patent Document 1, chipping is likely to occur at an intersecting ridgeline between a margin or the tip end flank face and a rake face in an outer peripheral end portion of the convex curve cutting edge portion which is located at the outermost periphery side of the drill main body among the cutting edges to provide a long cutting length. For this reason, wear occurs in the margin due to this chipping, resulting in deep linear scratches, and these scratches are transferred to an inner peripheral surface of a machined hole of a work material, thereby deteriorating a machined face quality, or flank face wear having a large wear width occurs on the tip end flank face, and in some cases, the convex curve cutting edge portion may be fractured, and thus such wear may shorten the tool life.

On the other hand, in the drill disclosed in Patent Document 2, since the rake face is provided with the negative land (a honing face), greater chipping does not easily occur at the outer peripheral end portion of the cutting edge compared to the drill disclosed in Patent Document 1.

However, in the drill disclosed in Patent Document 2, a width of the negative land as seen at a right angle to the axis is 0.03 mm to 0.15 mm, and a flat honing face still remains. In addition, since the radius of curvature of the convex curved surface of the first ridgeline at the position where the negative land and the flank face intersect with each other is as small as 0.015 mm to 0.035 mm with respect to the width of the negative land, minute chipping occurs on the convex curved surface of the first ridgeline and large flank face wear may also occur due to the minute chipping. The same applies to a case where the ridgeline between the rake face and the margin or the ridgeline between the negative land and the rake face is subjected to rounding in the drill disclosed in Patent Document 2. On the other hand, when the entire negative land of the cutting edge is subjected to rounding, at the cutting edge on the inner periphery side of the drill main body, cutting resistance may increase and breaking may occur.

The present invention has been made in view of these circumstances, and an object of the present invention is to provide a drill capable of suppressing wear of a flank face or a margin due to chipping especially at an outer peripheral end portion of a cutting edge without causing an increase in cutting resistance.

Solution to Problem

A drill of the present invention includes a chip removal groove on an outer periphery of a tip end portion of a drill main body rotating around an axis, and in which a cutting edge is formed at an intersecting ridgeline between a wall face of the chip removal groove which faces in a drill rotation direction and a tip end flank face of the drill main body, wherein a margin portion that is adjacent to a side of the chip removal groove opposite to the drill rotation direction is included in a land portion on an outer periphery of the drill main body between the chip removal grooves. The wall face of the chip removal groove which faces in the drill rotation direction includes a first wall face having a concave curve shape which is located on an inner periphery side of the drill main body in a cross section orthogonal to the axis, is recessed toward a side opposite to the drill rotation direction as it goes to the outer periphery side, and extends in the drill rotation direction, and a second wall face having a convex curve shape or a straight line shape which extends toward the inner periphery side from the outer periphery of the drill main body in the cross section orthogonal to the axis and intersects with the first wall face at an obtuse angle, and in the cross section orthogonal to the axis, a tangent at an outer peripheral end of a convex curve formed by the second wall face or an extension line of a straight line formed by the second wall face toward an outer periphery side of the drill main body extends to face in a direction opposite to the drill rotation direction as it goes to an outer periphery side of the drill main body with respect to a radius line connecting an outer peripheral end of the second wall face and the axis with each other. The cutting edge includes a first cutting edge having a concave curve shape which is formed at an intersecting ridgeline between the first wall face and the tip end flank face, and a second cutting edge having a convex curve shape or a straight line shape which is formed at an intersecting ridgeline between the second wall face and the tip end flank face and intersects with the first cutting edge at an obtuse angle, the first cutting edge and the second cutting edge are each provided with a first honing face and a second honing face which go to a posterior end side of the drill main body as they go in the drill rotation direction, and when the margin portion is viewed from a radially outer periphery side of the drill main body in a direction perpendicular to the axis, an intersecting ridgeline between the margin portion and the second honing face which is a honing face of the second cutting edge is formed in a convex curve shape entirely, and an intersecting ridgeline between the second honing face and the first honing face which is a honing face of the first cutting edge is formed in a convex curve shape having a larger radius of curvature than the intersecting ridgeline between the margin portion and the second honing face or a straight line shape.

In the drill with this configuration, first, in the wall face of the chip removal groove which faces in the drill rotation direction, the second wall face having a convex curved shape or a straight line shape in the cross section which extends toward the inner periphery side from the outer periphery of the drill main body and intersects with the first wall face at an obtuse angle extends such that, in the cross section orthogonal to the axis, the tangent at the outer peripheral end of the convex curve formed by the second wall face or the extension line of a straight line formed by the second wall face toward the outer periphery side of the drill main body extends to face in a direction opposite to the drill rotation direction as it goes to the outer periphery side of the drill main body with respect to a radius line connecting the outer peripheral end of the second wall face and the axis with each other, and thus it is possible to set an intersection angle between the second wall face and the margin portion to an obtuse angle.

For this reason, the strength of the intersecting ridgeline between the second wall face which is a rake face on the outer periphery side of the drill main body and the margin portion can be secured, and acceleration of margin wear can be suppressed. In addition, since the first wall face having a concave curved surface shape intersects with the second wall face at an obtuse angle, the first wall face functions as a chip breaker to curl chips into small pieces and prevent the chips from flowing out from the second wall face toward the margin portion, and thereby margin wear is further suppressed.

In addition, the first cutting edge and the second cutting edge are each provided with the first honing face and the second honing face which go to the posterior end side of the drill main body as they go in the drill rotation direction, and when the margin portion is viewed from a radially outer periphery side of the drill main body in a direction perpendicular to the axis, the intersecting ridgeline between the margin portion and the second honing face is formed in a convex curve shape entirely. Therefore, it is possible to secure the strength of the second cutting edge at the outer peripheral end portion of the drill main body of the cutting edge, it is possible to prevent minute chipping from occurring and increasing at the intersecting ridgeline between the second honing face and the tip end flank face or the margin portion, and it is possible to suppress flank face wear and margin wear due to such minute chipping.

On the other hand, since the intersecting ridgeline between the second honing face and the first honing face which is a honing face of the first cutting edge is formed in a convex curve shape having a larger radius of curvature than the intersecting ridgeline between the margin portion and the second honing face or a straight line shape, sharpness can be maintained at the second cutting edge on the inner periphery side of the drill main body and the first cutting edge. Therefore, in the whole cutting edge, it is possible to prevent cutting resistance from increasing and to prevent a situation in which breaking occurs in the drill main body.

Here, it is desirable that, when the margin portion is viewed from a radially outer periphery side of the drill main body in a direction perpendicular to the axis, a tilt angle of the second honing face which is formed between the axis and a straight line connecting both ends of a convex curve in a case where the intersecting ridgeline between the first honing face and the second honing face is the convex curve or a straight line in a case where the intersecting ridgeline between the first honing face and the second honing face is the straight line, be in a range of 13° to 22°, and in a cross section orthogonal to the axis, an inclination angle of the second wall face which is formed between the radius line and a tangent at an outer peripheral end of a convex curve in a case where the second wall face is the convex curve or an extension line of a straight line in a case where the second wall face is the straight line toward an outer periphery side of the drill main body, be in a range of 20° to 40°.

If the tilt angle of the second honing face is smaller than 13°, minute chipping is likely to occur on the second cutting edge and the flank face wear may increase. On the other hand, if the tilt angle of the second honing face is larger than 22°, the cutting resistance on the second cutting edge increases and the cutting load on the second honing face increases, and in a case where the coating film is coated, the coating film may easily break, and thus the flank face wear and the margin wear may be suddenly accelerated.

Further, if the inclination angle of the second wall face is smaller than 20°, the intersection angle between the first wall face and the second wall face in the cross section orthogonal to the axis becomes small and impairs the function of the first wall face as a chip breaker, and the chips flow out from the second wall face toward the margin portion and come into contact with the intersecting ridgeline between the second wall face and the margin portion, and thus the rake face wear of the second wall face in the intersecting ridgeline may increase and the margin wear may be accelerated. On the other hand, if the inclination angle of the second wall face is larger than 40°, the sharpness of the second cutting edge formed at the intersecting ridgeline between the second wall face and the tip end flank face is impaired, and thus the flank face wear may increase and the margin wear at the tip end portion of the drill main body may increase accordingly.

Note that it is desirable that a base material of the drill main body be a WC—Co based cemented carbide having a Co content of 10% by mass to 12% by mass and a hardness of 92.0 HRA to 93.0 HRA. By setting the base material of the drill main body to such a hardness, it is possible to obtain a drill having balanced toughness and wear resistance at a high level. However, even if the hardness of the base material is in such a range, if the Co content is less than 10% by mass, the toughness may decrease and the breaking may increase, and conversely, if the Co content is more than 12% by mass, the hardness of the base material may decrease and the wear resistance may decrease.

Note that it is desirable that the convex curve formed by the intersecting ridgeline between the margin portion and the second honing face have a radius of curvature of D×3 to D×15 (μm) with respect to a diameter D (mm) of a circle formed by the outer peripheral end of the cutting edge around the axis when viewed from an outer periphery side of the drill main body while facing the margin portion perpendicularly to the axis. If the radius of curvature of the convex curve formed by the intersecting ridgeline between the margin portion and the second honing face is smaller than D×3 (μm), the intersecting ridgeline becomes too small and a fracture may occur in the second cutting edge or the margin portion. On the other hand, if the radius of curvature is larger than D×15 (μm), the above-mentioned intersecting ridgeline becomes closer to a straight line, and a fracture is likely to occur at an intersection point between the intersecting ridgeline and the tip end flank face or an intersection point between the intersecting ridgeline and the second wall face.

Advantageous Effects of Invention

As described above, according to this invention, in the whole cutting edge, it is possible to maintain sharpness and to prevent breaking or the like of the drill main body due to increase in cutting resistance, and in the outer peripheral end portion of the second cutting edge which is a cutting edge on the outer periphery side of the drill main body, it is possible to secure cutting strength and to prevent the occurrence of minute chipping on the second honing face. For this reason, it is possible to suppress the occurrence of large flank face wear and margin wear on the tip end flank face and the margin portion due to such minute chipping.

BEST MODE FOR CARRYING OUT THE INVENTION

FIGS. 1 to 5 show an embodiment of the present invention. In the present embodiment, a drill main body 1 is formed in a substantially circular column shape centered on an axis O using a hard material such as a cemented carbide, wherein a posterior end portion (not shown) is a shank portion that has the circular column shape as it is and a tip end portion is a cutting edge portion 2. In such a drill, the shank portion is gripped by a main shaft of a machine tool and is fed to a tip end side (an upper side in FIG. 2) in a direction of the axis O while being rotated about the axis O in a drill rotation direction T, and a cutting edge 3 formed at a tip of the cutting edge portion 2 performs drilling on a work material.

Figure 1:
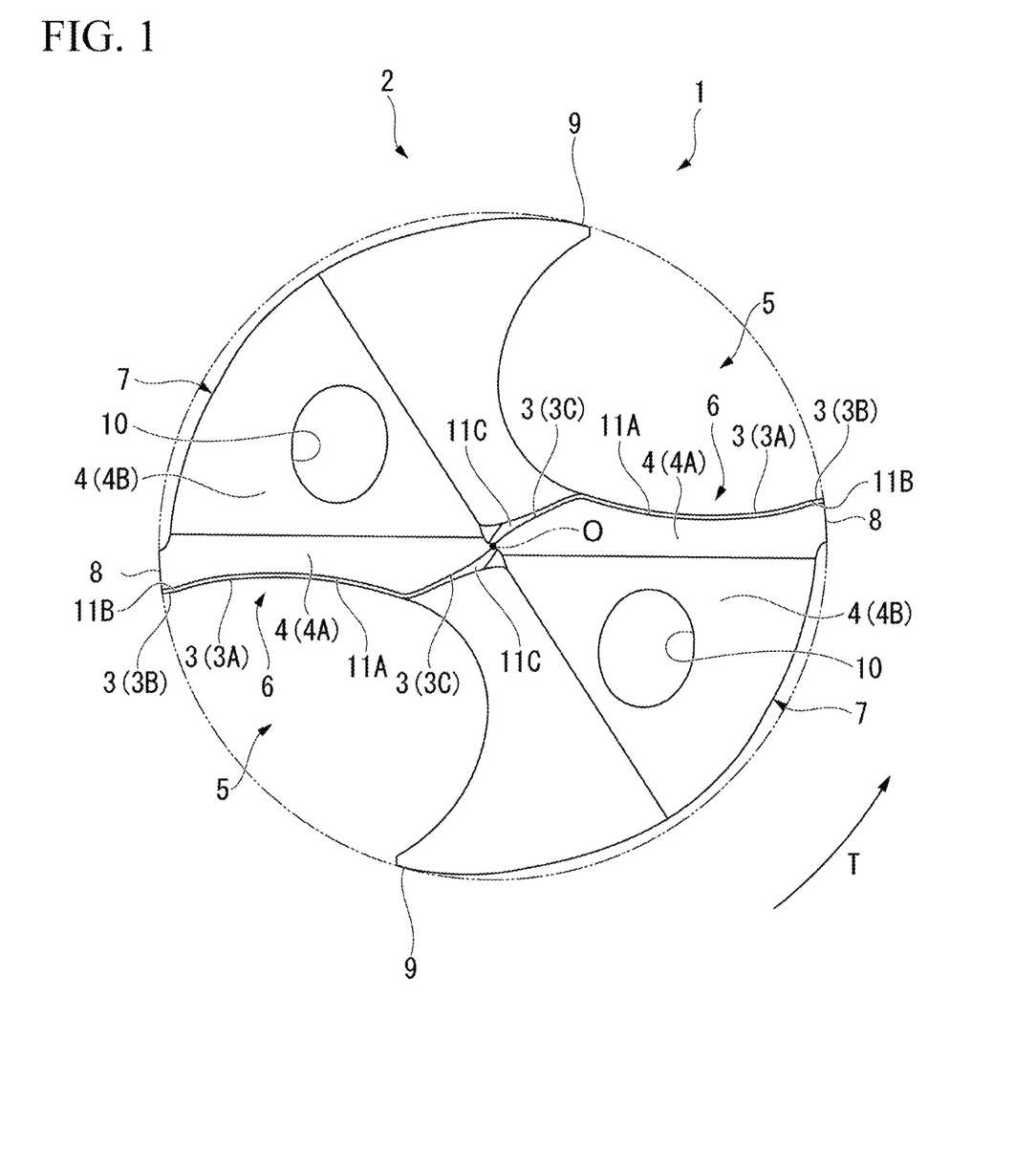
FIG. 1 is a front view showing an embodiment of the present invention from a tip end side in a direction of an axis.
Figure 2:
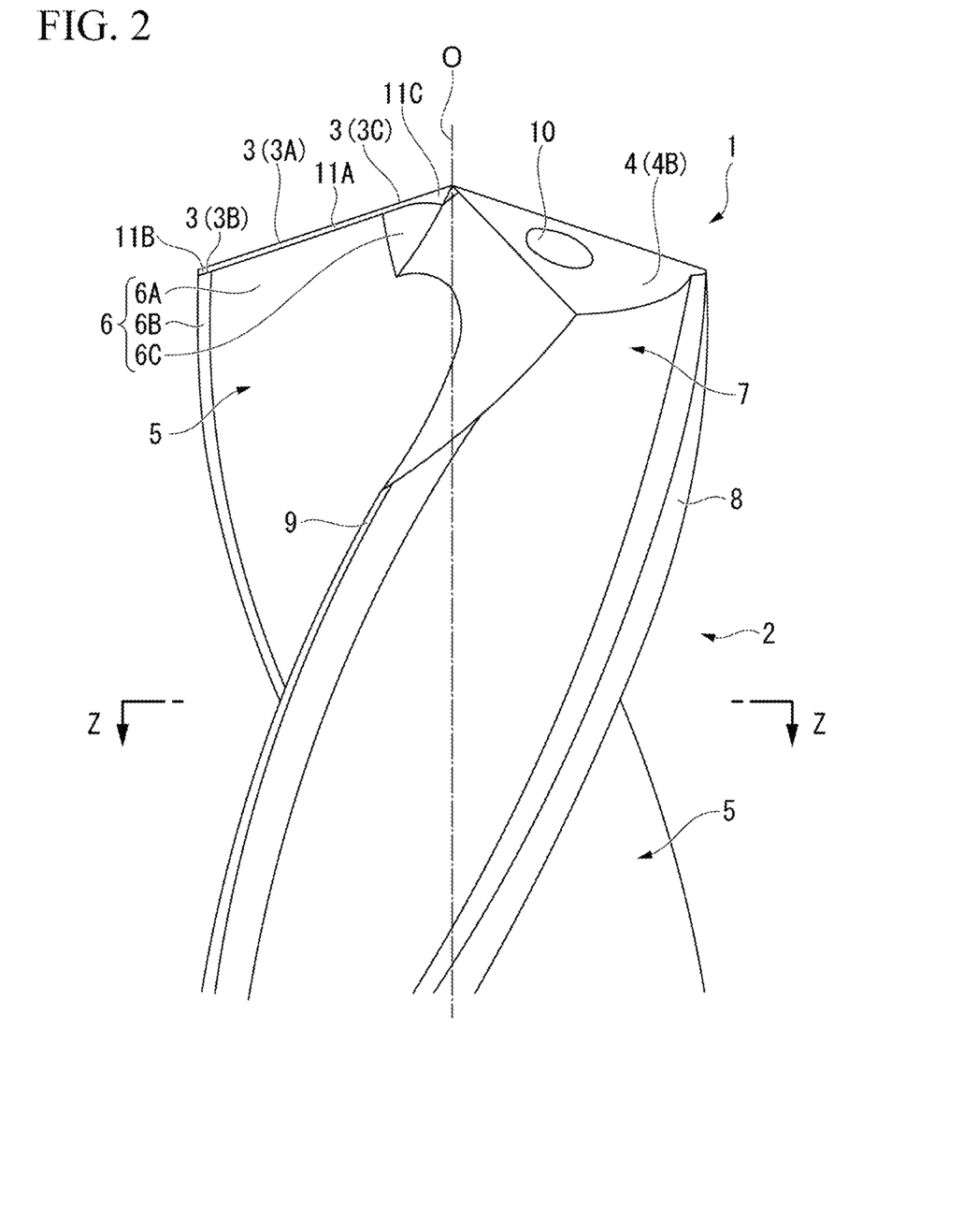
FIG. 2 is a side view of the embodiment shown in FIG. 1.

Two chip removal grooves 5 which open on a tip end flank face 4 that is a tip end surface of the drill main body 1 and are twisted in a direction opposite to the drill rotation direction T as they go to a posterior end side of the drill main body 1, are formed at an outer peripheral portion of the cutting edge portion 2 to be rotationally symmetric with respect to the axis O. The cutting edge 3 is formed at an intersecting ridgeline between a wall face 6 of each of these chip removal grooves 5 which faces in the drill rotation direction T and the tip end flank face 4 of the drill main body 1. The tip end flank face 4 is formed to go to a posterior end side as it goes to an outer periphery side of the drill main body 1, thereby giving a predetermined tip end angle to the cutting edge 3, and is formed to go the posterior end side of the drill main body 1 as it goes to a side opposite to the drill rotation direction T, thereby giving a predetermined flank angle to the cutting edge 3.

In addition, a margin portion (a first margin portion) 8 that is adjacent to a side of the chip removal groove 5 opposite to the drill rotation direction T and is located on a cylindrical surface having a diameter equal to a circle obtained by an outer peripheral end of the cutting edge 3 being rotated around the axis O is formed in a land portion 7 on an outer periphery of the drill main body 1 between the chip removal grooves 5. In the present embodiment, a margin portion (a second margin portion) 9 is also formed at a position adjacent to the chip removal groove 5 in the drill rotation direction T in the land portion 7 to make a double margin type drill. Here, these margin portions 8 and 9 may be provided with a back taper so that the diameter gradually decreases as it goes to the posterior end side of the drill main body 1.

In the present embodiment, the tip end flank face 4 includes a first tip end flank face 4A and a second tip end flank face 4B in two steps in which the flank angle increases stepwise as it goes to a side opposite to the drill rotation direction T. In the drill main body 1, a coolant hole 10 extends toward the tip end side from the posterior end of the shank portion to pass through the land portion 7 between the two chip removal grooves 5. These coolant holes 10 open on the second tip end flank face 4B located on a side of the tip end flank face 4 opposite to the drill rotation direction T to supply a coolant to the cutting edge 3 or a cut part of the work material during drilling.

Figure 3:
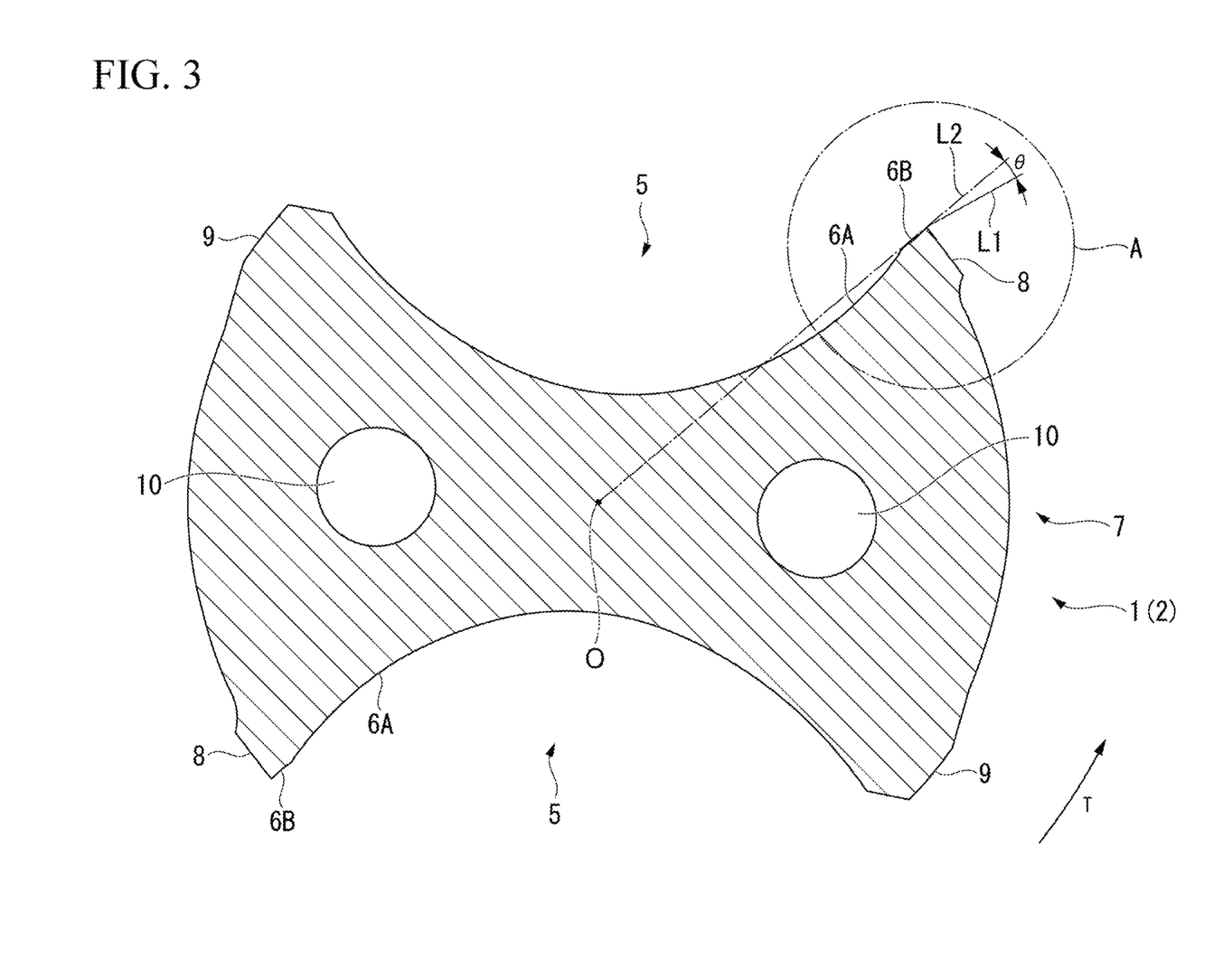
FIG. 3 is a sectional view along line ZZ in FIG. 2.

Further, the wall face 6 of the chip removal groove 5 which faces in the drill rotation direction T includes a first wall face 6A having a concave curve shape which is located on an inner periphery side of the drill main body 1 in a cross section orthogonal to the axis O, is recessed toward a side opposite to the drill rotation direction T as it goes to the outer periphery side, and extends in the drill rotation direction T, and a second wall face 6B having a convex curve shape or a straight line shape which extends toward the inner periphery side from the outer periphery of the drill main body 1 in the cross section orthogonal to the axis O similarly and intersects with the first wall face 6A at an obtuse angle. In the present embodiment, the second wall face 6B has a straight line shape in the cross section orthogonal to the axis O. The wall face 6 further includes a thinning face 6C that intersects with the first wall face 6A at an obtuse angle on the inner periphery side of the drill main body 1 and extends in the vicinity of the axis O of the tip end flank face 4.

Figure 4:
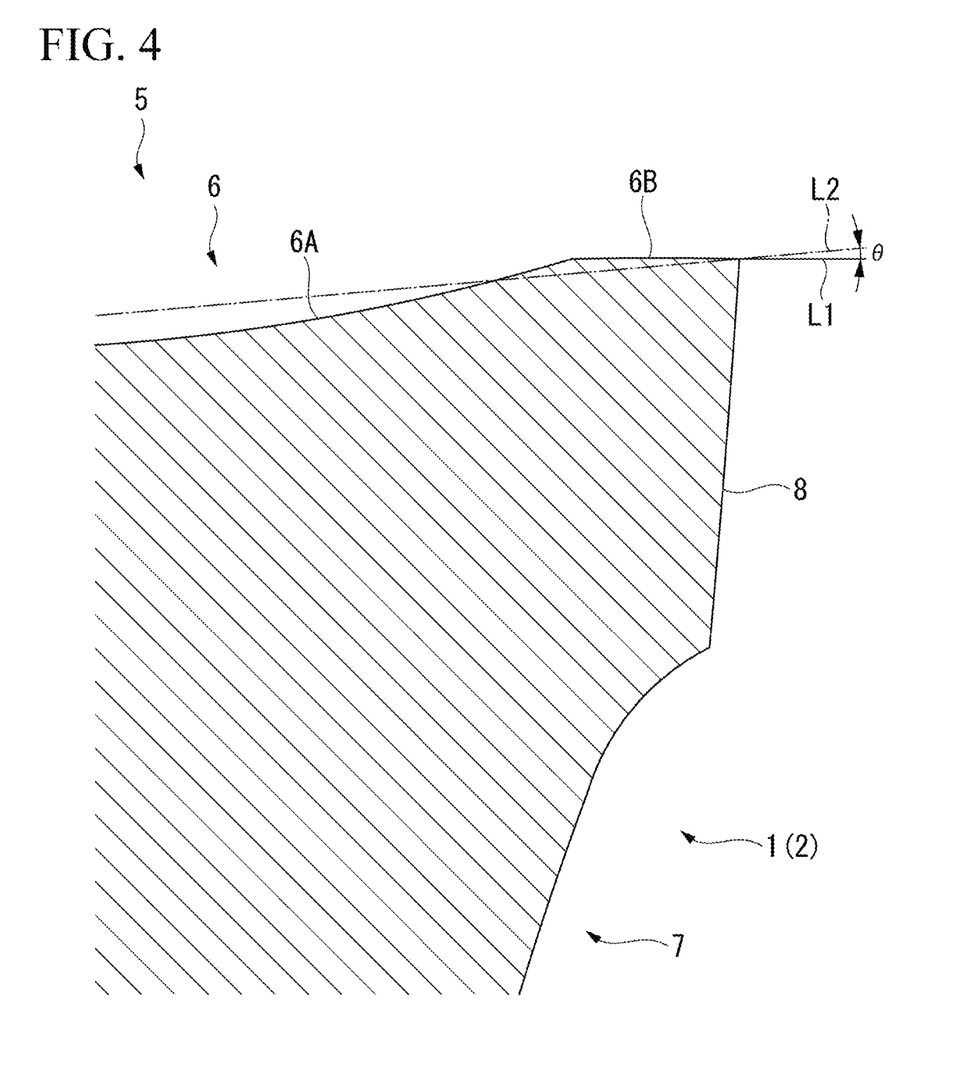
FIG. 4 is an enlarged sectional view of a portion A in FIG. 3.

Here, as shown in FIG. 4, in the cross section orthogonal to the axis O, an extension line L1 of a straight line formed by the second wall face 6B toward the outer periphery side of the drill main body 1 extends to face in a direction opposite to the drill rotation direction T as it goes to the outer periphery side of the drill main body 1 with respect to a radius line L2 connecting an outer peripheral end of the second wall face 6B and the axis O with each other. In the present embodiment, an inclination angle θ of the second wall face 6B formed by the extension line L1 with respect to the radius line L2 is in a range of 20° to 40°. In a case where the second wall face 6B has a convex curve shape in the cross section orthogonal to the axis O, a tangent at the outer peripheral end of the convex curve formed by the second wall face 6B extends to face a direction opposite to the drill rotation direction T as it goes to the outer periphery side of the drill main body 1 with respect to the radius line L2, and the inclination angle θ of the second wall face 6B becomes an inclination angle formed by the tangent with respect to the radius line L2.

By forming the first wall face 6A and the second wall face 6B on the wall face 6 of the chip removal groove 5 which faces in the drill rotation direction T, the cutting edge 3 includes a first cutting edge 3A having a concave curve shape as seen from the tip end side in the direction of the axis O at an intersecting ridgeline between the first wall face 6A and the tip end flank face 4, and a second cutting edge 3B having a convex curve shape or a straight line shape which intersects with the first cutting edge 3A at an obtuse angle as seen from the tip end side in the direction of the axis O similarly at an intersecting ridgeline between the second wall face 6B and the tip end flank face 4. In the present embodiment, the second cutting edge 3B has a straight line shape. In addition, the cutting edge 3 of the present embodiment includes a thinning edge 3C which extends in a direction intersecting with the first cutting edge 3A at an obtuse angle and reaches the vicinity of the axis O at an intersecting ridgeline between the thinning face 6C and the tip end flank face 4.

Further, the first cutting edge 3A and the second cutting edge 3B of the cutting edge 3 are subjected to a honing process, so that a first honing face 11A and a second honing face 11B which go to the posterior end side of the drill main body 1 as they go in the drill rotation direction T, are formed on the first cutting edge and the second cutting edge, respectively. Similarly, a thinning honing face 11C which goes to the posterior end side of the drill main body 1 as it goes in the drill rotation direction T is formed on the thinning edge 3C.

Figure 5:
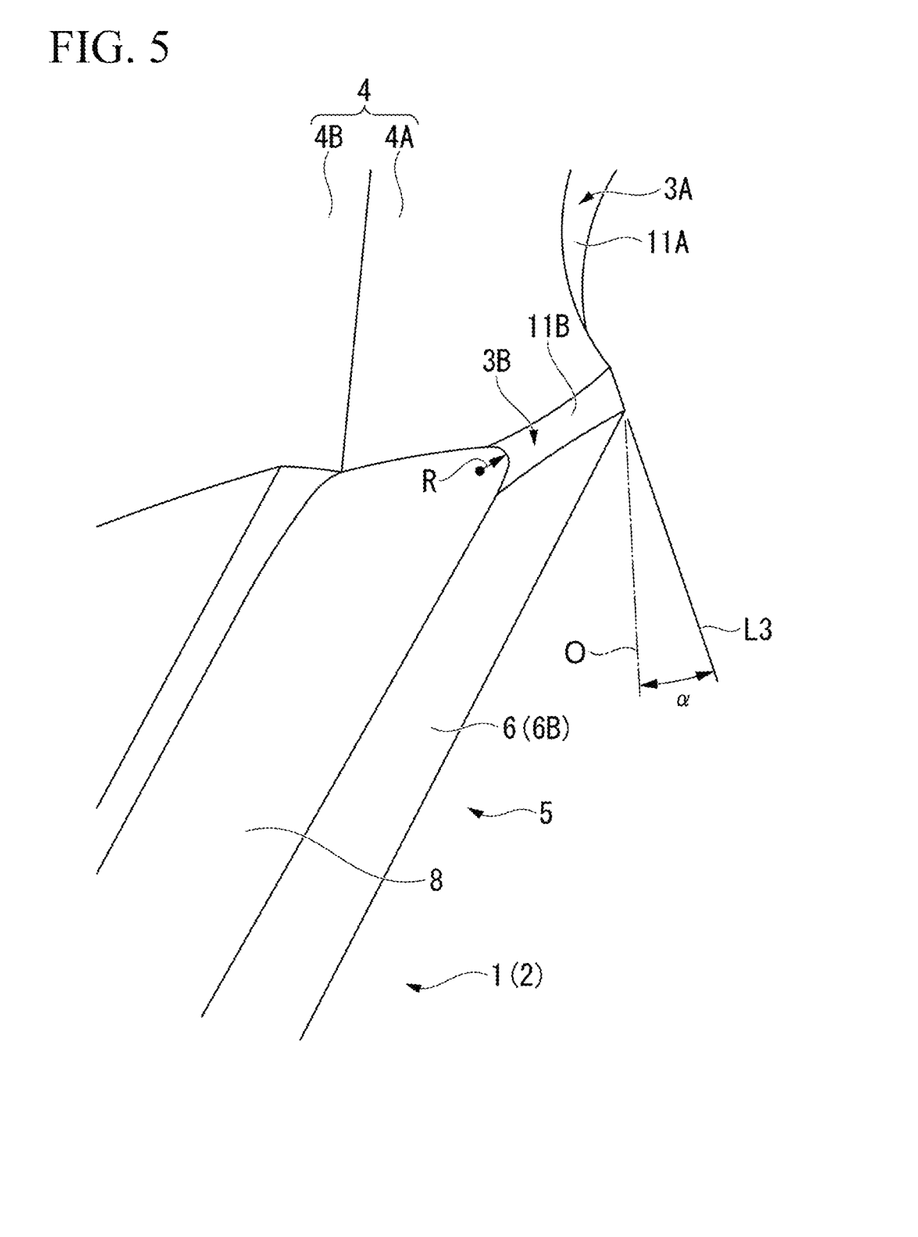
FIG. 5 is an enlarged side view of a margin portion of the embodiment shown in FIG. 1 from a radially outer periphery side of a drill main body in a direction perpendicular to an axis.

Among these, the first honing face 11A which is a honing face of the first cutting edge 3A and the thinning honing face 11C which is a honing face of the thinning edge 3C are subjected to chamfer honing to have a straight line shape in a cross section that is parallel to the axis O and intersects with the first cutting edge 3A and the thinning edge 3C at each position. On the other hand, in the second honing face 11B which is a honing face of the second cutting edge 3B, an intersecting ridgeline with the margin portion (the first margin portion) 8 is formed in a convex curve shape as shown in FIG. 5, and an intersecting ridgeline with the first honing face 11A is formed in a convex curve shape having a larger radius of curvature than the intersecting ridgeline between the margin portion 8 and the second honing face 11B or a straight line shape. In the present embodiment, the intersecting ridgeline between the first honing face 11A and the second honing face 11B has a straight line shape.

In the present embodiment, when the margin portion 8 is viewed from a radially outer periphery side of the drill main body 1 in a direction perpendicular to the axis O, or more specifically, when the margin portion is viewed in a direction of a radius line which is perpendicular to the axis O and passes through an intersection point between the first honing face 11A, the second honing face 11B, and the second wall face 6B as shown FIG. 5, a tilt angle α of the second honing face 11B which is formed between the axis O and a straight line L3 formed by the intersecting ridgeline between the first honing face 11A and the second honing face 11B is in a range of 13° to 22°. In a case where the intersecting ridgeline between the first honing face 11A and the second honing face 11B has a convex curve shape, the tilt angle α of the second honing face 11B may be obtained by setting a straight line connecting both ends of the convex curve as the straight line L3.

Further, in the present embodiment, the hard material forming a base material of the drill main body 1 is a WC—Co based cemented carbide having a Co content of 10% by mass to 12% by mass and a hardness of 92.0 HRA to 93.0 HRA. Further, a surface of the cutting edge portion 2 including an inner surface of the chip removal groove 5 of the drill main body 1 formed of such a base material is coated with a hard coating film of a nitride mainly composed of Al and Cr, a nitride mainly composed of Al and Ti, a nitride mainly composed of Ti and Si, or the like.

Regarding the drill having such a configuration, first, in the wall face 6 of the chip removal groove 5 which faces in the drill rotation direction T, the second wall face 6B having a convex curved shape or a straight line shape in the cross section which extends toward the inner periphery side from the outer periphery of the drill main body 1 and intersects with the first wall face 6A at an obtuse angle extends such that, in the cross section orthogonal to the axis O, the tangent at the outer peripheral end of the convex curve formed by the second wall face 6B or the extension line L1 of a straight line formed by the second wall face 6B toward the outer periphery side of the drill main body extends to face in a direction opposite to the drill rotation direction T as it goes to the outer periphery side of the drill main body 1 with respect to a radius line L2 connecting the outer peripheral end of the second wall face 6B and the axis O with each other. For this reason, an intersection angle between the second wall face 6B and the margin portion (the first margin portion) 8 can be set to an obtuse angle.

For this reason, the strength of the intersecting ridgeline between the second wall face 6B which is a rake face on the outer periphery side of the drill main body 1 and the margin portion 8 can be secured, and margin wear can be suppressed. In addition, since the first wall face 6A having a concave curve shape in a cross section intersects with the second wall face 6B having a convex curved shape or a straight line shape in a cross section at an obtuse angle, the first wall face 6A functions as a chip breaker to curl chips into small pieces and prevent the chips from flowing out from the second wall face 6B toward the margin portion 8, and thereby margin wear is further suppressed.

In addition, the first cutting edge 3A and the second cutting edge 3B are each provided with the first honing face 11A and the second honing face 11B which go to the posterior end side of the drill main body 1 as they go in the drill rotation direction T, and when the margin portion 8 is viewed from a radially outer periphery side of the drill main body 1 in a direction perpendicular to the axis O, the intersecting ridgeline between the margin portion 8 and the second honing face 11B is formed in a convex curve shape entirely. Therefore, it is possible to secure the strength of the second cutting edge 3B at the outer peripheral end portion of the drill main body 1 of the cutting edge 3, and it is possible to prevent minute chipping from occurring and increasing at the intersecting ridgeline between the second honing face 11B and the tip end flank face 4 (the first tip end flank face 4A) or the margin portion 8. For this reason, it is also possible to suppress the flank face wear and the margin wear due to such minute chipping.

On the other hand, since the intersecting ridgeline between the second honing face 11B and the first honing face 11A which is a honing face of the first cutting edge 3A, is formed in a convex curve shape having a larger radius of curvature than the intersecting ridgeline between the margin portion 8 and the second honing face 11B or a straight line shape, sharpness can be maintained at the second cutting edge 3B on the inner periphery side of the drill main body 1 and the first cutting edge 3A. For this reason, in the whole cutting edge 3, it is possible to prevent cutting resistance from increasing and to prevent a situation in which the drill main body 1 breaks due to excessive cutting resistance.

Further, in the present embodiment, when the margin portion 8 is viewed from a radially outer periphery side of the drill main body 1 in a direction perpendicular to the axis O, the tilt angle α of the second honing face 11B which is formed between the axis O and the straight line formed by the intersecting ridgeline between the first honing face 11A and the second honing face 11B is in a range of 13° to 22°, and in the cross section orthogonal to the axis O, the inclination angle θ of the second wall face 6B which is formed between the extension line L1 of a straight line formed by the second wall face 6B toward the outer periphery side of the drill main body 1 and the radius line L2 connecting the outer peripheral end of the second wall face 6B and the axis O with each other is in a range of 20° to 40°, and thereby the cutting resistance is reliably prevented from increasing while the flank face wear is effectively prevented from being accelerated.

That is, if the tilt angle α of the second honing face 11B is smaller than 13°, minute chipping is likely to occur on the second cutting edge 3B and the flank face wear may increase. Conversely, if the tilt angle α of the second honing face 11B is larger than 22°, the cutting resistance on the second cutting edge 3B increases and the cutting load on the second honing face 11B increases, and in a case where the coating film is coated as in the present embodiment, the coating film may easily break and the flank face wear and the margin wear may suddenly accelerate. Note that the tilt angle α is more preferably in a range of 15° to 20°.

Further, if the inclination angle θ of the second wall face 6B is smaller than 20°, the intersection angle between the first wall face 6A and the second wall face 6B in the cross section orthogonal to the axis O becomes small and impairs the function of the first wall face 6A as the above-described chip breaker, and the chips flow out from the second wall face 6B toward the margin portion 8 and come into contact with the intersecting ridgeline between the second wall face 6B and the margin portion 8, and thus the rake face wear of the second wall face 6B in the intersecting ridgeline may increase and the margin wear may be accelerated. On the other hand, if the inclination angle θ of the second wall face 6B is larger than 40°, the sharpness of the second cutting edge 3B formed at the intersecting ridgeline between the second wall face 6B and the tip end flank face 4 is impaired, and thus the flank face wear may increase and the margin wear at the tip end portion of the drill main body 1 may increase accordingly. Note that the inclination angle θ is more preferably in a range of 30° to 40°.

Further, in the present embodiment, the base material of the drill main body 1 is a WC—Co based cemented carbide having a Co content of 10% by mass to 12% by mass and a hardness of 92.0 HRA to 93.0 HRA, and thus it is possible to obtain a drill having balanced toughness and wear resistance at a high level. That is, if the hardness of the base material of the drill main body 1 is less than 92.0 HRA, the wear resistance may be impaired, whereas if it is more than 93.0 HRA, the toughness may be impaired and the breaking may be easily caused. Further, if the Co content is less than 10% by mass, the toughness may decrease and the breaking may increase, and conversely, if the Co content is more than 12% by mass, the hardness of the base material may decrease and the wear resistance may decrease.

In addition, it is desirable that the convex curve formed by the intersecting ridgeline between the margin portion 8 and the second honing face 11B have a radius of curvature of D×3 to D×15 (unit: μm) with respect to a diameter D (mm) of the cutting edge 3, that is, a diameter of a circle formed by the outer peripheral end of the cutting edge 3 around the axis O when viewed from the outer periphery side of the drill main body 1 while facing the margin portion 8 perpendicularly to the axis O. If the radius of curvature of the convex curve formed by the intersecting ridgeline between the margin portion 8 and the second honing face 11B is smaller than D×3 (μm), the intersecting ridgeline becomes too small and a fracture may occur in the second cutting edge 3B or the margin portion 8. On the other hand, if the radius of curvature is larger than D×15 (μm), the above-mentioned intersecting ridgeline becomes closer to a straight line, and a fracture is likely to occur at an intersection point between the intersecting ridgeline and the tip end flank face 4 or an intersection point between the intersecting ridgeline and the second wall face 6B.

EXAMPLES

Next, the effect of limiting particularly the numerical values of the tilt angle α of the second honing face 11B and the inclination angle θ of the second wall face 6B of the present invention will be demonstrated with examples of the present invention. In this example, twelve kinds of drills were manufactured based on the above-described embodiment in a varying manner in which the diameter D of the cutting edge 3 is 6 mm, the length of the cutting edge portion 2 is 30 mm, the tilt angle α of the second honing face 11B is in a range of 13° to 22°, the inclination angle θ of the second wall face 6B is in a range of 20° to 40°, and the radius of curvature is D×3 to D×15 (18 μm to 90 μm) with respect to a diameter D (6 mm) of the cutting edge 3 when the convex curve formed by the intersecting ridgeline between the margin portion 8 and the second honing face 11B is viewed from the outer periphery side of the drill main body 1 while facing the margin portion 8 perpendicularly to the axis O. Drilling was performed to the work material of S50C using these drills, in which 450 blind holes each having a depth of 30 mm were formed with a rotation number of 4246 min$^{-1}$, a rotation speed of 80 m/min, a feed speed of 764 mm/min, and a feed per rotation of 0.18 mm/rev while supplying water-soluble coolant at 2.2 MPa, and the flank face wear and the margin wear were evaluated. Setting these results as Examples 1 to 12, the above-mentioned tilt angle α and inclination angle θ, the radius of curvature R of the convex curve formed by the intersecting ridgeline between the margin portion 8 and the second honing face 11B, and the types of the base material of the drill main body 1 are shown in Table 1.

Further, as comparative examples with respect to Examples 1 to 12, 11 types of drills in which at least one of the tilt angle α of the second honing face 11B, the inclination angle θ of the second wall face 6B, and the radius of curvature R of the convex curve formed by the intersecting ridgeline between the margin portion 8 and the second honing face 11B is not in the range of the above-described embodiment and which have the same shape and the same dimensions as those of Examples 1 to 12, were manufactured, drilling was performed under the same conditions as the examples, and the flank face wear and the margin wear were evaluated. The results are shown in Table 2 as Comparative Examples 1 to 11.

Note that a base material A of the drill main body 1 is a WC—Co based cemented carbide having a Co content ratio of 11% by mass and a hardness of 91.5 HRA, and a base material B of the drill main body is a WC—Co based cemented carbide having a Co content ratio of 11% by mass and a hardness of 92.5 HRA. Further, the surface of the cutting edge portion 2 of the drill main body 1 form of the base materials A and B is coated with a coating film having a film structure in which TiSiN having a high hardness is provided on a laminated film obtained by laminating AlCrSiN and AlTiN alternately with a thickness of 10 nm or less.

Figure 6:
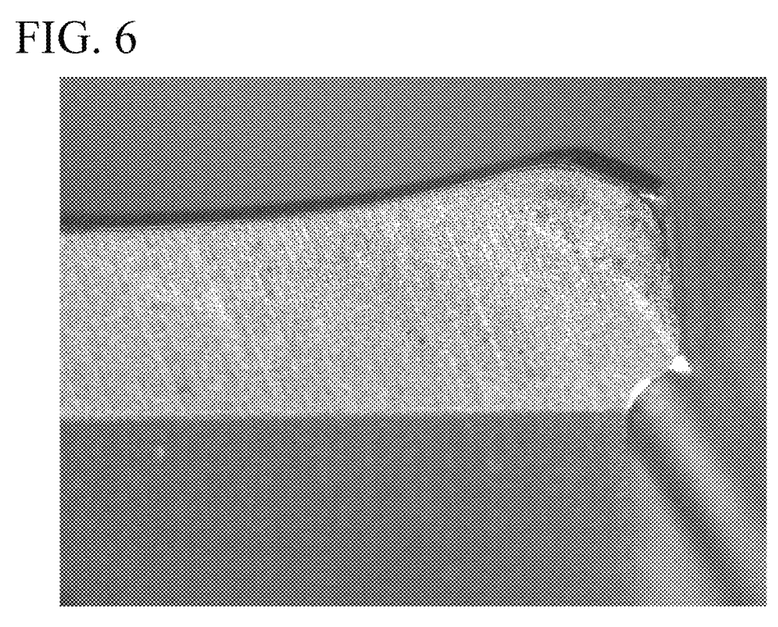
FIG. 6 is a view showing a state in which a fracture occurs in a cutting edge or the like in flank face wear.
Figure 7A:
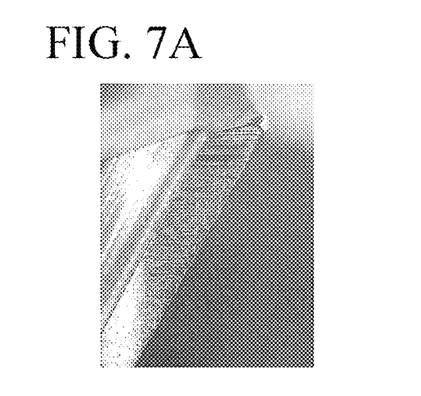
FIG. 7A is a view showing normal margin wear.
Figure 7B:
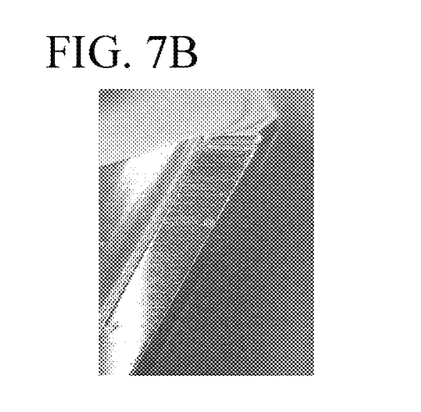
FIG. 7B is a view showing a case where a shallow linear scratch is present in margin wear.
Figure 7C:
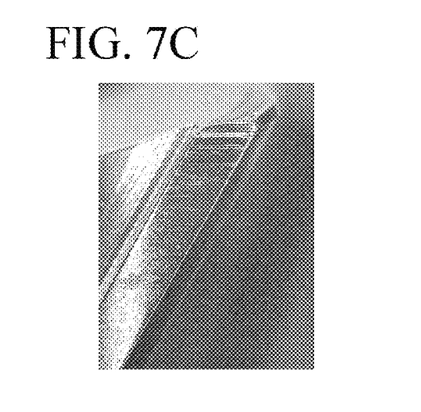
FIG. 7C is a view showing a case where one deep linear scratch is present in margin wear.
Figure 7D:
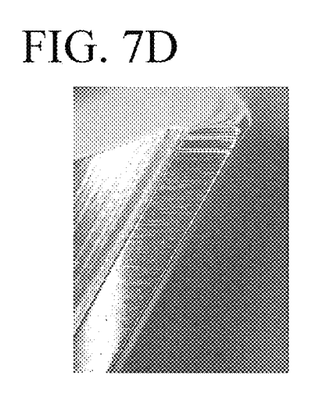
FIG. 7D is a view showing a case where two deep linear scratches are present in margin wear.

In the evaluation of the flank face wear, a case where a wear width is of less than 100 μm is indicated with a double circle mark, a case where a wear width is 100 μm or more and 110 μm or less is indicated with a circle mark, a case where a wear width is more than 110 μm is indicated with a triangle mark, a case where a fracture occurs in the cutting edge 3 as shown FIG. 6 is indicated with a cross mark. As for the margin wear, a case of normal wear as shown in FIG. 7A is indicated with a double circle mark, a case where a shallow linear scratch is present as shown in FIG. 7B is indicated with a circle mark, a case where one deep linear scratch is present as shown in FIG. 7C is indicated with a triangle mark, and a case where two deep linear scratches are present as shown in FIG. 7D is indicated with a cross mark.

TABLE 1

| | Base material | Inclination angle θ | Tilt angle α | Radius of curvature R | Flank face wear | Margin wear |
|---|---|---|---|---|---|---|
| Example 1 | A | 30° | 18° | 70 μm | ⊙ | O |
| Example 2 | B | 33° | 18° | 70 μm | ⊙ | ⊙ |
| Example 3 | A | 36° | 18° | 70 μm | ⊙ | O |
| Example 4 | A | 40° | 18° | 70 μm | ⊙ | ⊙ |
| Example 5 | A | 23° | 15° | 70 μm | ⊙ | O |
| Example 6 | A | 27° | 15° | 70 μm | ⊙ | O |
| Example 7 | A | 30° | 15° | 70 μm | ⊙ | O |
| Example 8 | A | 25° | 20° | 40 μm | ⊙ | O |

TABLE 1-continued

| | Base material | Inclination angle θ | Tilt angle α | Radius of curvature R | Flank face wear | Margin wear |
|---|---|---|---|---|---|---|
| Example 9 | A | 25° | 20° | 50 μm | ⊙ | O |
| Example 10 | A | 25° | 20° | 90 μm | ⊙ | O |
| Example 11 | B | 25° | 20° | 50 μm | ⊙ | ⊙ |
| Example 12 | B | 25° | 20° | 70 μm | ⊙ | ⊙ |

TABLE 2

| | Base material | Inclination angle θ | Tilt angle α | Radius of curvature R | Flank face wear | Margin wear |
|---|---|---|---|---|---|---|
| Comparative Example 1 | A | 20° | 23° | ∞ (Straight line) | X | X |
| Comparative Example 2 | A | 11° | 23° | ∞ (Straight line) | O | X |
| Comparative Example 3 | A | 11° | 23° | 70 μm | O | X |
| Comparative Example 4 | A | 11° | 18° | 70 μm | O | Δ |
| Comparative Example 5 | A | 20° | 23° | 30 μm | O | X |
| Comparative Example 6 | A | 20° | 23° | 70 μm | Δ | X |
| Comparative Example 7 | A | 20° | 23° | 80 μm | O | X |
| Comparative Example 8 | A | 25° | 23° | 70 μm | Δ | X |
| Comparative Example 9 | A | 34° | 23° | 70 μm | Δ | Δ |
| Comparative Example 10 | B | 20° | 25° | ∞ (Straight line) | X | X |
| Comparative Example 11 | A | 25° | 25° | 70 μm | O | Δ |

From the results shown in Table 1, in Comparative Examples 1 to 11 in which at least one of the tilt angle α of the second honing face 11B and the inclination angle θ of the second wall face 6B is out of the range of the above-described embodiment, particularly the margin wear tended to be remarkable, and the scratch made on the margin portion 8 was transferred to the machined holes of the work material, resulting in deterioration of the machined face quality. On the other hand, in Examples 1 to 12 based on the above embodiment, the flank face wear was all normal wear of less than 100 μm, the margin wear was also an extent where a shallow scratch was made on the margin portions 8 in Examples 1, 3, 5 to 10, and the machined face quality of the machined hole of the work material was not impaired.

INDUSTRIAL APPLICABILITY

According to this invention, in the whole cutting edge, it is possible to maintain sharpness and to prevent breaking or the like of the drill main body due to increase in cutting resistance, and in the outer peripheral end portion of the second cutting edge which is a cutting edge on the outer periphery side of the drill main body, it is possible to secure cutting strength and to prevent the occurrence of minute chipping on the second honing face. For this reason, it is possible to suppress the occurrence of large flank face wear and margin wear on the tip end flank face and the margin portion due to such minute chipping.

REFERENCE SIGNS LIST

1 Drill main body
2 Cutting edge portion

3 Cutting edge
3A First cutting edge
3B Second cutting edge
4 Tip end flank face
5 Chip removal groove
6 Wall face of chip removal groove 5 which faces in drill rotation direction T
6A First wall face
6B Second wall face
7 Land portion
8 Margin portion (first margin portion)
11A First honing face
11B Second honing face
O Axis of drill main body 1
T Drill rotation direction
L1 Extension line of straight line formed by second wall face 6B in cross section orthogonal to axis O toward outer periphery side of drill main body 1
L2 Radius line connecting outer peripheral end of second wall face 6B and axis O
L3 Straight line formed by intersecting ridgeline between first honing face 11A and second honing face 11B when margin portion 8 is viewed from radially outer periphery side of drill main body 1 in direction perpendicular to axis O
α Tilt angle of second honing face
θ Inclination angle of second wall face

The invention claimed is:

1. A drill which includes a chip removal groove on an outer periphery of a tip end portion of a drill main body rotating around an axis, and in which a cutting edge is formed at an intersecting ridgeline between a wall face of the chip removal groove which faces in a drill rotation direction and a tip end flank face of the drill main body,
wherein a margin portion that is adjacent to a side of the chip removal groove opposite to the drill rotation direction is included in a land portion on an outer periphery of the drill main body between the chip removal grooves,
wherein the wall face of the chip removal groove which faces in the drill rotation direction includes:
a first wall face having a concave curve shape which is located on an inner periphery side of the drill main body in a cross section orthogonal to the axis, is recessed toward a side opposite to the drill rotation direction as the first wall face goes to the outer periphery side, and extends in the drill rotation direction; and
a second wall face having a convex curve shape or a straight line shape which extends toward the inner periphery side from the outer periphery of the drill main body in the cross section orthogonal to the axis and intersects with the first wall face at an obtuse angle,
wherein, in the cross section orthogonal to the axis, a tangent at an outer peripheral end of a convex curve formed by the second wall face or an extension line of a straight line formed by the second wall face toward an outer periphery side of the drill main body extends to face in a direction opposite to the drill rotation direction as the tangent or the extension line goes to an outer periphery side of the drill main body with respect to a radius line connecting an outer peripheral end of the second wall face and the axis with each other,
wherein the cutting edge includes:
a first cutting edge having a concave curve shape which is formed at an intersecting ridgeline between the first wall face and the tip end flank face; and
a second cutting edge having a convex curve shape or a straight line shape which is formed at an intersecting ridgeline between the second wall face and the tip end flank face and intersects with the first cutting edge at an obtuse angle,
wherein the first cutting edge and the second cutting edge are each provided with a first honing face and a second honing face which go to a posterior end side of the drill main body as the first honing face and the second honing face go in the drill rotation direction, and
wherein, when the margin portion is viewed from a radially outer periphery side of the drill main body in a direction perpendicular to the axis, an intersecting ridgeline between the margin portion and the second honing face which is a honing face of the second cutting edge is formed in a convex curve shape entirely, and an intersecting ridgeline between the second honing face and the first honing face which is a honing face of the first cutting edge is formed in a convex curve shape having a larger radius of curvature than the intersecting ridgeline between the margin portion and the second honing face or a straight line shape.

2. The drill according to claim 1,
wherein, when the margin portion is viewed from a radially outer periphery side of the drill main body in a direction perpendicular to the axis, a tilt angle of the second honing face which is formed between the axis and a straight line connecting both ends of a convex curve formed by the intersecting ridgeline between the first honing face and the second honing face or a straight line formed by the intersecting ridgeline between the first honing face and the second honing face is in a range of 13° to 22°, and
wherein, in a cross section orthogonal to the axis, an inclination angle of the second wall face which is formed between the radius line and a tangent at an outer peripheral end of a convex curve formed by the second wall face or an extension line of a straight line formed by the second wall face toward an outer periphery side of the drill main body is in a range of 20° to 40°.

3. The drill according to claim 2, wherein a base material of the drill main body is a WC—Co based cemented carbide having a Co content of 10% by mass to 12% by mass and a hardness of 92.0 HRA to 93.0 HRA.

4. The drill according to claim 2, wherein the convex curve formed by the intersecting ridgeline between the margin portion and the second honing face has a radius of curvature of D×3 to D×15 (μm) with respect to a diameter D (mm) of a circle formed by the outer peripheral end of the cutting edge around the axis when viewed from an outer periphery side of the drill main body while facing the margin portion perpendicularly to the axis.

5. The drill according to claim 1, wherein a base material of the drill main body is a WC—Co based cemented carbide having a Co content of 10% by mass to 12% by mass and a hardness of 92.0 HRA to 93.0 HRA.

6. The drill according to claim 5, wherein the convex curve formed by the intersecting ridgeline between the margin portion and the second honing face has a radius of curvature of D×3 to D×15 (μm) with respect to a diameter D (mm) of a circle formed by the outer peripheral end of the cutting edge around the axis when viewed from an outer periphery side of the drill main body while facing the margin portion perpendicularly to the axis.

7. The drill according to claim 1, wherein the convex curve formed by the intersecting ridgeline between the margin portion and the second honing face has a radius of curvature of D×3 to D×15 (μm) with respect to a diameter D (mm) of a circle formed by the outer peripheral end of the cutting edge around the axis when viewed from an outer periphery side of the drill main body while facing the margin portion perpendicularly to the axis.

* * * * *